(12) United States Patent
Sheafor

(10) Patent No.: US 6,473,813 B1
(45) Date of Patent: Oct. 29, 2002

(54) MODULE BASED ADDRESS TRANSLATION ARRANGEMENT AND TRANSACTION OFFLOADING IN A DIGITAL SYSTEM

(75) Inventor: Stephen J. Sheafor, Boulder, CO (US)

(73) Assignee: Sitera, Inc., Longmont, CO (US)

( * ) Notice: Subject to any disclaimer, the term of this patent is extended or adjusted under 35 U.S.C. 154(b) by 0 days.

(21) Appl. No.: 09/376,763

(22) Filed: Aug. 17, 1999

(51) Int. Cl.[7] .............................................. G06F 13/28
(52) U.S. Cl. ............................ 710/31; 710/33; 710/300
(58) Field of Search ................................ 710/101, 131, 710/31, 107, 240, 33, 300, 305

(56) References Cited

U.S. PATENT DOCUMENTS

| | | | | |
|---|---|---|---|---|
| 4,263,649 A | * | 4/1981 | Lapp, Jr. et al. ............. | 710/107 |
| 4,814,974 A | * | 3/1989 | Narayanan et al. .... | 340/825.51 |
| 4,847,757 A | * | 7/1989 | Smith .......................... | 710/114 |
| 5,634,060 A | * | 5/1997 | Jennings ..................... | 710/113 |
| 6,119,188 A | * | 9/2000 | Sheafor et al. ............. | 710/107 |

* cited by examiner

Primary Examiner—Jeffrey Gaffin
Assistant Examiner—Harold Kim
(74) Attorney, Agent, or Firm—Michael Pritzkau

(57) ABSTRACT

An address translation arrangement and associated method for use in a digital system are described. The system includes a plurality of modules and a bus arrangement which interconnects the modules for executing data transactions using the bus arrangement. Each data transaction includes an address portion which defines a data portion. A first one of the modules is configured for initiating the address portion of the data transaction on the bus arrangement. A second one of the modules is configured for receiving the address portion of the transaction on the bus arrangement from the first module and includes a translation arrangement configured for selecting, based on a set of criteria including the address portion, (i) the second module to participate in the data portion with the first module and for, (ii) as an alternative, generating a translated address portion such that the translated address portion identifies one of the modules, other than the first or second module and, thereafter, for sending the translated address portion to the identified one of the modules such that the identified module then participates in the data portion of the transaction with the first module.

46 Claims, 3 Drawing Sheets

MODULE BASED ADDRESS TRANSLATION ARRANGEMENT AND TRANSACTION OFFLOADING IN A DIGITAL SYSTEM

BACKGROUND OF THE INVENTION

The present invention relates generally to the field of digital data systems and associated bus arrangements and, more particularly, to a highly advantageous address translation arrangement for use in a digital system.

Digital systems incorporating a plurality of modules have been configured in a number of ways with regard to the manner in which data is transferred between the modules using a bus arrangement that interconnects the modules. Certain modules such as, for example, memory management modules may serve to select one of a number of memory modules to serve as a destination module that ultimately receives a data transfer originating from a source module. In accordance with one prior art implementation (not shown), a common bus interconnects the source module, the memory management module and the destination module. A data transfer is performed by first transferring the data from the source module to the memory manager module. Thereafter, the data is transferred from the memory manager module to the destination module. It should be appreciated that, while the bus arrangement in this implementation is flexible in nature (i.e., additional modules may be connected to the common bus), the memory manager module must disadvantageously be configured with sufficient memory to store the entirety of the data transfer. A further disadvantage in this implementation resides in the fact that the data transfer is, in essence, performed twice. Accordingly, for a single data transfer, twice the bandwidth associated with performing the data transfer a single time is required.

Attention is now directed to FIG. 1 which illustrates another prior art implementation for performing a data transfer using a system that is generally indicated by the reference number 10. System 10 includes modules A–D which are interconnected by a bus arrangement 12. The bus arrangement includes buses 12a–c which define dedicated data transfer paths between the modules, as illustrated. When compared with the previously described implementation, it should be appreciated that bus arrangement 12 is configured in a customized manner to establish required data transfer paths in hardware. That is, a single bus does not interconnect all of the modules. Rather, provisions for data paths are made in hardware (buses 12a–c) after the need for a particular data path becomes evident.

Still referring to FIG. 1, for purposes of the present discussion, a data transfer is contemplated in which module A serves as a source module while either module C or D may serve as the destination module. In order to reach the destination module, however, bus arrangement 12 is configured such that the data transfer must pass through module B. This implementation is advantageous over the previously discussed implementation for the reason that module B is not required to store a complete data transfer. Unfortunately, however, this implementation is disadvantageous for the reason that the bus arrangement is highly inflexible. If additional modules such as, for example, modules E and F (shown in phantom) are added, dedicated buses 12d and 12e (also shown in phantom) must also typically be added. Thus, data may be transferred between module E and module A on bus 12d and between module F and module C on bus 12e. Moreover, it is likely that the customized bus arrangement interconnecting modules A–C comprising buses 12a–c will not facilitate data transfers between modules E and F via modules A–C. For this purpose, still another bus 12f will be added in hardware. It is apparent that some point may be reached at which the system will be unable to accommodate further expansion due to architectural constraints so as to require redesign.

The present invention introduces a highly advantageous address translation arrangement which resolves the foregoing disadvantageous and which provides still further advantages, as will be described.

SUMMARY OF THE INVENTION

As will be described in more detail hereinafter, there is disclosed herein an address translation arrangement and associated method for use in a digital system. Like the system of FIG. 1, a system manufactured in accordance with the present invention includes a plurality of modules and a bus arrangement which interconnects the modules for executing data transactions using the bus arrangement. Each data transaction includes an address portion which defines a data portion. In accordance with the present invention, however, the improvement comprises a first one of the modules configured for initiating the address portion of the data transaction on the bus arrangement. A second one of the modules is configured for receiving the address portion of the transaction on the bus arrangement from the first module and includes a translation arrangement configured for selecting, based on a set of criteria including the address portion, (i) the second module to participate in the data portion with the first module or, (ii) as an alternative, generating a translated address portion such that the translated address portion identifies one of the modules, other than the first or second module and, thereafter, sends the translated address portion to the identified one of the modules such that the identified module then participates in the data portion of the transaction with the first module.

BRIEF DESCRIPTION OF THE DRAWINGS

The present invention may be understood by reference to the following detailed description taken in conjunction with the drawings briefly described below.

DETAILED DESCRIPTION OF THE INVENTION

Figure 1:
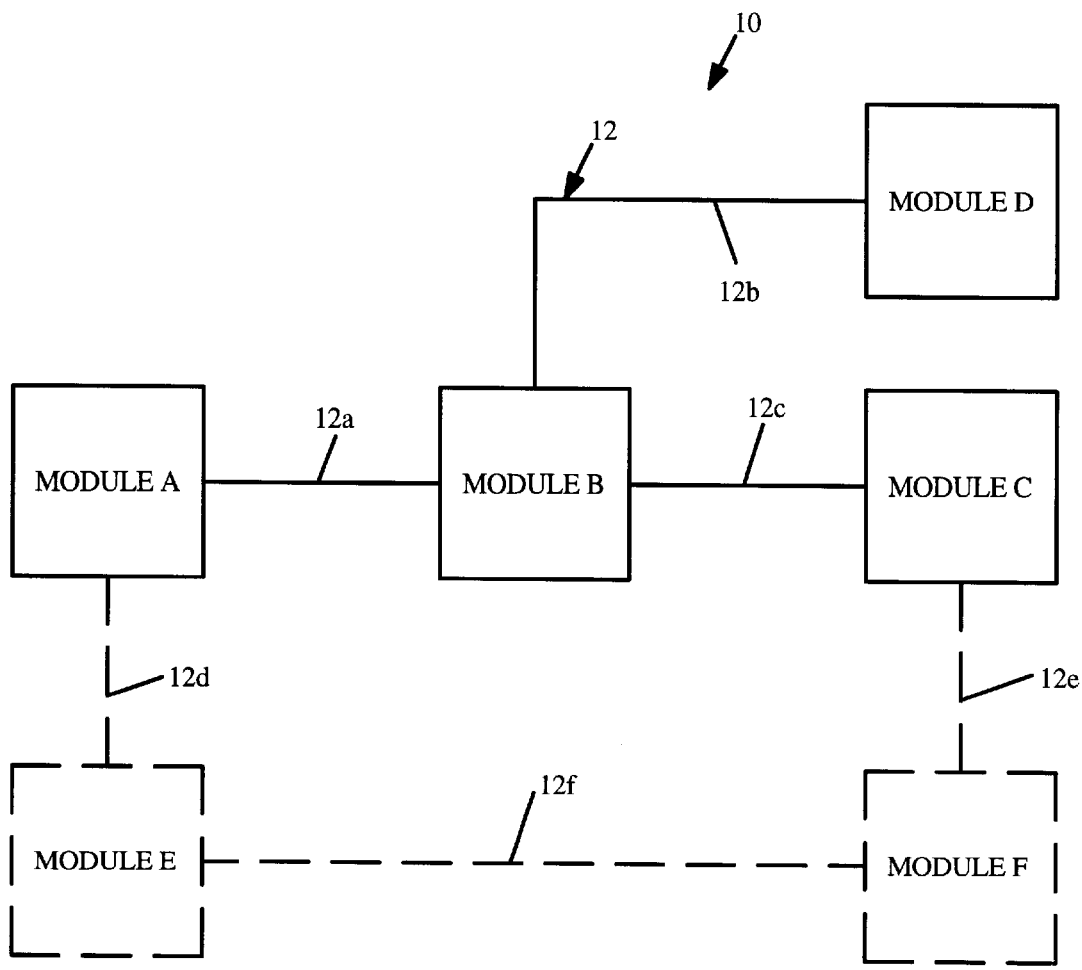
FIG. 1 is a diagrammatic representation, in block diagram form, of a prior art digital system shown here to illustrate a typical bus arrangement and further illustrating certain concerns with regard to system expansion.
Figure 2:
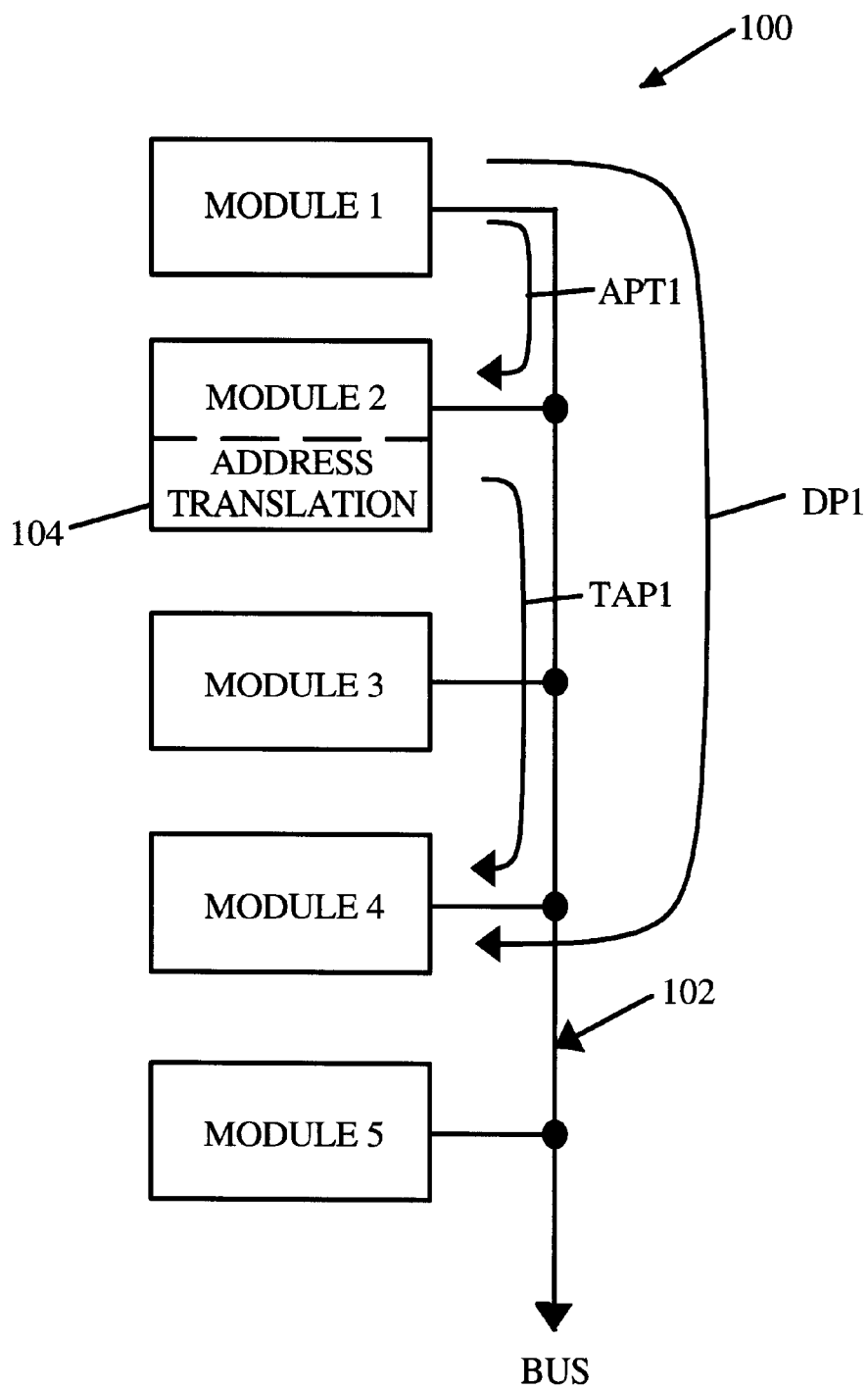
FIG. 2 is a diagrammatic representation, in block diagram form, of a digital system manufactured in accordance with the present invention and shown here to illustrate the highly advantageous address translation arrangement and associated method by which a first data transaction is executed by the system.

Having previously described FIG. 1, attention is immediately directed to FIG. 2 which illustrates a digital system manufactured in accordance with the present invention and generally indicated by the reference numeral 100. System 100 includes modules 1–5 connected with a bus arrangement 102. In one highly advantageous implementation, system 100 is produced in accordance with the teachings of U.S. patent application Ser. No. 08/863,875 entitled Bus Arrangements for Interconnection of Discrete and/or Integrated Modules in a Digital System and Associated Method, filed May 27, 1997, which is incorporated herein by reference. In the present example, bus arrangement 102 comprises a multiplexed bus interconnecting all of the modules and serving for the transfer of both data and addressing information. Other bus arrangements may be found to be suitable so long as an address bus interconnects the modules and the capability is provided for performing transactions having an addressing portion and a data portion wherein the addressing and data portions may be separated in time. It should be appreciated that separate addressing and data portions represents only one feature of the above incorporated application.

Still referring to FIG. 2, as mentioned, system 100 performs transactions each of which includes an address portion which defines a data portion. The latter may include either one or both of a data transfer and a processing step. In accordance with the present invention, module 1 is configured for originating an address portion APT1, as indicated by an arrow, of a transaction T1 to module 2. While module 2 may be configured for accepting address portions from modules other than module 1, module 1 always and only originates address portions to module 2 for transactions with the other modules of FIG. 2. For this purpose, module 2 includes a highly advantageous address translation section 104 which utilizes APT1. The specific configuration of module 2 and modules 3–5 may vary according to an intended application. For example modules 3–5 may each comprise processors having essentially identical capability. Using mechanisms to be described, module 2 is aware of certain aspects of the status of modules 3–5. Based on the status of modules 3–5, module 2, using address translation section 104, selects one of modules 3–5 to perform T1. In the present example, module 2 selects module 4 and then generates a translated address portion, TAP1, and sends TAP1, as indicated by an arrow, over bus arrangement 100 to module 4.

Still referring to the above example in which address translation section 104 of module 2 selects module 4 and sends translated address portion TAP1 to module 4, it should be appreciated that module 2 has effectively "off-loaded" T1 to module 4. Upon receiving TAP1, which defines the data operation to be performed with module 1, module 4 then participates in data portion DP1 of T1 in order to complete the transaction. With regard to the aforementioned monitoring mechanisms used by module 2, it is first important to note that module 2 does not monitor the data transfer itself. Rather, the capabilities and status of modules 3–5 are tracked by a combination of internal information maintained within module 2 and information transferred to module 2 from modules 3–5. Selection of a destination module by address translation module 2 may be based on factors including, but not limited to the current module utilization or the particular function implied or required by the transfer. In one feature, module 2 may also include processing capabilities such that address translation section 104 may select module 2 to perform the data portion, DP1, of transaction T1 in which case a translated address portion would not be generated on the bus arrangement.

With continuing reference to FIG. 2, in systems (not shown) which include one or more data buses and a separate address bus, it should be appreciated that, while the address bus must be attached to all of the modules, each data bus need not be attached to all of the modules. Per the example in FIG. 2, the data portion, DP1, of T1 could readily be performed using a data bus which is not necessarily connected to address translation module 2 so long as the data bus is attached to modules 1 and 3.

Figure 3:
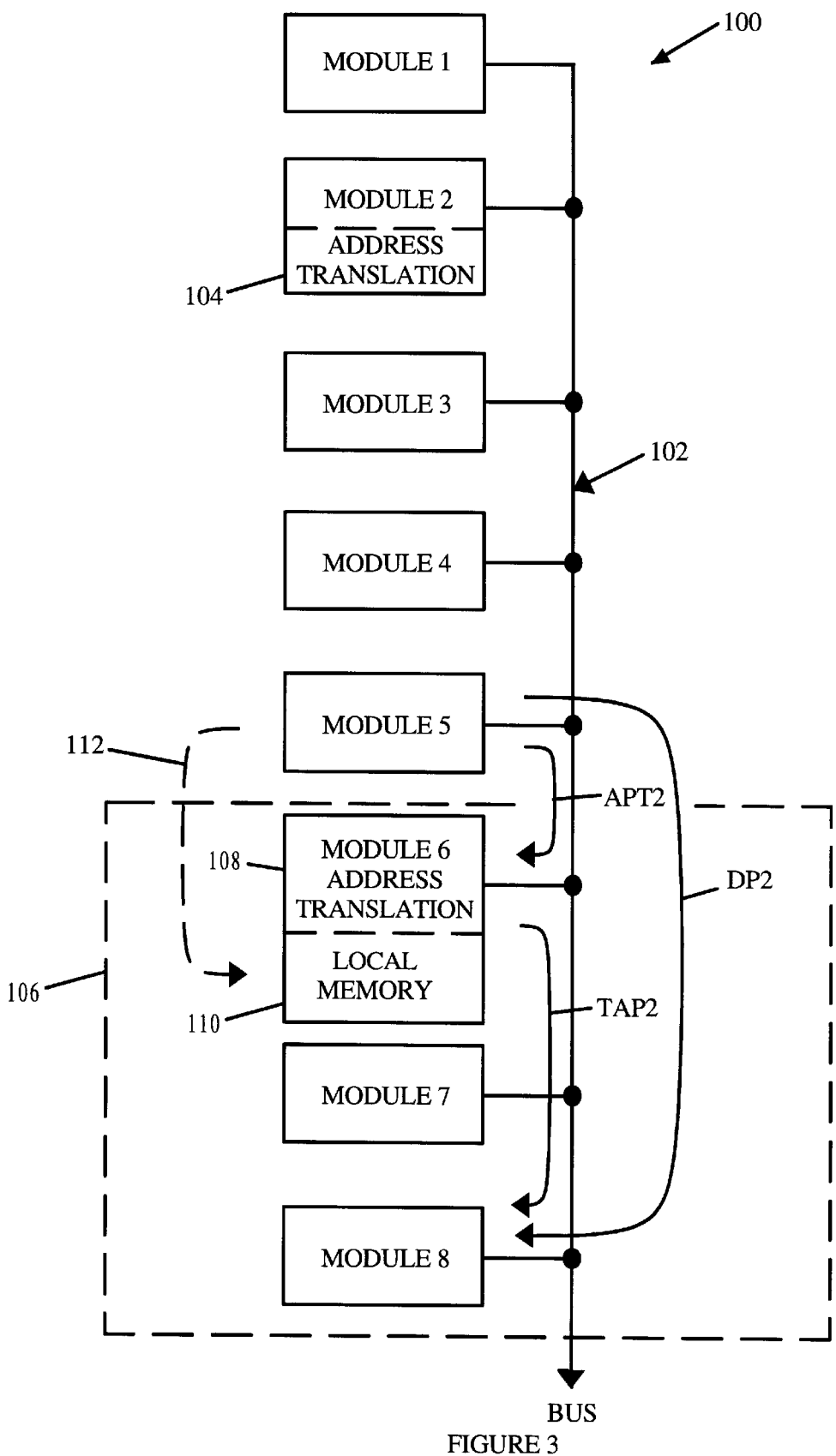
FIG. 3 is a diagrammatic representation, in block diagram form, of the digital system of FIG. 2 shown here to illustrate system expansion in accordance with the present invention and further illustrating the performance of a second data transaction in accordance with the teachings of the present invention.

Turning to FIG. 3, system 100 has been expanded through the addition of a memory expansion arrangement 106 within a dashed line which demonstrates at least one aspect of the flexibility of the system in terms of ease of expansion. Memory expansion arrangement 106 includes modules 6–8. It should be appreciated that a memory expansion arrangement has been selected in the present example for illustrative purposes and that processing or any other function may be added and/or expanded in 20 essentially the same manner by adding an arrangement of modules interconnected with bus arrangement 102. In memory expansion arrangement 106, module 6 may comprise a second address translation module including an address translation section 108 while modules 7 and 8 may comprise separate memory modules. Module 6 may then delegate or refer memory transactions to module 7 or 8. For example, a second transaction, T2, may be originated by module 5 to module 6 beginning with the address portion of T2, APT2. Module 6, like module 2 described above, is configured to monitor predetermined operational aspects of modules 7 and 8 using address translation section 108. In the instance of memory modules, these aspects may include, but are not limited to remaining storage space, the module in which specific information is known to be stored and performance requirements of a particular access. Upon accepting address portion APT2, address translation section 108 will select a module to participate in the data transfer portion of transaction T2. In the present example, transaction T2 comprises a write operation for which the destination is selected as module 8. Accordingly, address translation section 108 generates translated address portion TAP2 which is then sent to module 8 over the bus arrangement. Thereafter, data portion DP2 of T2 is transferred to module 8, as indicated. In the instance of a read operation (not shown), address translation arrangement 108 will identify the storage location of the data and translate the address portion to the appropriate module. For example, in order to read the information stored by transaction T2, a third transaction would appear diagrammatically identical to FIG. 3 except that the originating module could be one other than module 5 and the direction of DP3 would be reversed to point to the originating module. In this regard, data stored in association with T2 appears to other system resources to be stored at module 6 when, in fact, the data is stored at module 8.

Still referring to FIG. 3, in one feature, module 6 may be configured to include a fast local memory 110 such that address translation section 108 will permit transaction T2 to store associated data in local memory 110 provided that sufficient space is available in the local memory. That is, DP2 is performed as indicated diagrammatically by a dashed line 112. However, if space is sufficient space is not available, T2 may be performed as described above with module 8. Of course, a read operation seeking the data stored in module 6 in association with T2 will be directed to local memory 110 if this data is stored therein. The local memory feature is advantageous in enhancing system performance and offloading transfers from slower memory modules.

Referring to FIGS. 2 and 3, it is important to understand that the address translation configuration of the present invention is highly advantageous for more than its inherent flexibility. As an example, it should be appreciated that the address translation module does not participate in the data portion of a transaction that is translated to another module. In fact, the address translation module does not even monitor data portions of transactions as they occur. For this reason, there is no requirement to connect address translation modules to a system data bus (not shown) in systems which include one or more separate data buses. Furthermore, address translation modules relieve modules originating transactions (modules 1 and 5 here) of the burden of monitoring distributed system resources. In terms of system expansion, this feature is highly advantageous since many transaction originating modules initially provided in a system are designed to cooperate with other resources in the form of a single module such as, for example, a coprocessor. In such a case, one or more additional coprocessors may only be added by completely reconfiguring the existing transaction originating module. The present invention, in contrast, allows a more cost effective solution by allowing an existing transaction originating module to continue to communicate with a single resource in the form of an address translation module which itself may translate transactions to a number of separate coprocessors to improve system resources and bandwidth. In this way, an existing transaction originating module will experience or "see" no change in its environment despite the fact that system capability is markedly enhanced.

Turning again to FIG. 3, it is also contemplated that more than one address translation module may be configured to select from a common group of modules for transaction translation. Assuming for a moment that modules 6–8 comprise a processing expansion, or a combination processing/ storage expansion, module 2 and module 6 may each be configured to translate transactions to the group of modules 3–5 in essentially the same manner as described above. In this regard, the address translation modules, as above, still do not monitor the data portions of transactions, but may maintain a common set of parameters to assist in the process of selecting the destination module.

In one useful configuration (not shown), a set of stacks or queues may be maintained at a specified memory location. Rather than directly addressing an address translation module, another module can write data to the stack or queue by always writing to the same specified memory location. The memory translation module configured in accordance with the present invention will then remotely manage the stack and translate write or read operations to appropriate locations within the overall system address configuration. In this way, the accessing modules require no knowledge with regard to the current state of the stack or queue. It is considered that one having ordinary skill in the art is capable of making and using the invention in view of this overall disclosure.

One having ordinary skill in the art may devise many alternative configurations for the address translation bus arrangement and associated method disclosed herein. Therefore, it should be understood that the present invention may be embodied in many other specific forms without departing from the spirit or scope of the invention and that the present examples and method are to be considered as illustrative and not restrictive, and the invention is not to be limited to the details given herein, but may be modified within the scope of the appended claims.

What is claimed is:

1. In a digital system including at least three modules for executing a data transaction using a bus arrangement which interconnects said modules, said data transaction including an address portion which defines a data portion, the improvement comprising:

a) a first one of said modules configured for initiating the address portion of said data transaction on said bus arrangement; and b) a second one of said modules configured for receiving the address portion of the transaction on the bus arrangement from the first module and including a translation arrangement configured for selecting, based on a set of criteria, (i) the second module to participate in the execution of said data portion with said first module and for, (ii) as an alternative, generating a translated address portion such that the translated address portion identifies another one of said modules, other than said first or second module and, thereafter, sends the translated address portion to the identified one of the modules such that the identified module then participates in said data portion of the transaction with said first module.

2. The improvement of claim 1 wherein said second module includes means for storing and tracking said set of criteria.

3. The improvement of claim 1 wherein said bus arrangement includes at least one bus which interconnects all of said modules and which serves at least as an address bus and wherein said first module initiates the address portion of the transaction on said bus serving as the address bus and said second module sends the translated address portion on said bus serving as the address bus.

4. The improvement of claim 1 wherein said system includes at least four modules such that a selected one from a group including at least two of the modules may serve as the identified module and wherein said set of criteria, used by said translation arrangement in selecting the identified module, includes data relating to each of the modules which may serve as the identified module.

5. The improvement of claim 1 wherein said set of criteria includes information specifying utilization of the second module and the other modules.

6. The improvement of claim 1 wherein the second module and the other modules include processing means for use during the data portion of said data transaction.

7. The improvement of claim 1 wherein the second module and the other modules each include memory means for storing data and said data portion is performed by storing data associated with said data portion in the memory means of the second module or, alternatively, in the memory means of the identified module.

8. In a digital system including a plurality of modules for executing a series of data transactions using a bus arrangement which interconnects said modules, each data transaction including an address portion which defines an associated data portion, the improvement comprising:

a) a first one of said modules configured for serially initiating the address portion of each data transaction on said bus arrangement; and b) a second one of said modules configured for receiving the initiated address portion of each data transaction on the bus arrangement from the first module and including a translation arrangement configured for selecting, based on a set of criteria including said initiated address portion, (i) the second module to participate in the associated data portion of the initiated address portion and for, as an alternative, (ii) generating a translated address portion such that the translated address portion identifies one of said modules, other than said first or second module, and, thereafter, for sending the translated address portion to the identified one of the modules, such that the identified module then participates in the execution of the associated data portion, using said translated address portion, with said first module.

9. The improvement of claim 8 wherein said second module includes means for storing and tracking said set of criteria.

10. The improvement of claim 8 wherein said bus arrangement includes at least one bus which interconnects all of said modules and which serves at least as an address bus and wherein said first module initiates the address portion of each transaction on said bus serving as the address bus and said second module sends the translated address portion on said bus serving as the address bus.

11. The improvement of claim 8 wherein said system includes at least four modules such that a selected one from a group including at least two of the modules may serve as the identified module and wherein said set of criteria, used by said translation arrangement in selecting the identified module, includes data relating to each of the modules which may serve as the identified one of the modules.

12. The improvement of claim 8 wherein said set of criteria includes information specifying utilization of the second module and the other modules.

13. The improvement of claim 8 wherein the second module and the other modules include processing means for use during the associated data portion of each data transaction.

14. The improvement of claim 8 wherein the second module and the other modules each include memory means for storing data and said data portion of each data transaction is performed by storing data associated with the data portion in the memory means of the second module or, alternatively, in the memory means of the identified module.

15. In a digital system including a plurality of modules for executing a data transaction using a bus arrangement which interconnects said modules, said data transaction including an address portion which defines a data portion, a method comprising the steps of:
  a) initiating the address portion of said data transaction on said bus arrangement using a first one of said modules;
  b) receiving the address portion of the transaction on the bus arrangement from the first module using a second module; and
  c) based on a set of criteria, performing said data portion using the second module or selectively generating a translated address portion such that the translated address portion identifies one of said modules, other than said first or second module and, thereafter, the second module sends the translated address portion to the identified one of the modules and the identified module then participates, using said translated address portion, in the execution of said data portion of the transaction with said first module.

16. The method of claim 15 including the step of tracking said set of criteria using said second module.

17. The method of claim 15 wherein said bus arrangement includes at least one bus which interconnects all of said modules and which serves at least as an address bus and wherein the address portion of the transaction is initiated on said bus serving as the address bus and said second module sends the translated address portion on said bus serving as the address bus.

18. The method of claim 15 wherein said system includes at least four modules such that a selected one from a group including at least two of the modules may serve as the identified module and wherein said set of criteria, used by said translation arrangement in selecting the identified module, includes data relating to each of the modules which may serve as the identified one of the modules.

19. The method of claim 15 wherein said system includes at least four modules such that a selected one from a group including at least two of the modules may serve as the identified module for a particular data transaction and wherein said set of criteria, used by said translation arrangement in selecting the identified module, includes data relating to each of the modules which may serve as the identified module.

20. The method of claim 15 wherein said set of criteria includes information specifying utilization of the second module and the other modules.

21. The method of claim 15 wherein the second module and the other modules include processing means and the step of performing said data portion includes the step of using the processing means in the module which executes said data portion.

22. The method of claim 15 wherein the second module and the other modules each include memory means for storing data and said data portion is performed by storing data associated with said data portion in the memory means of the second module or, alternatively, in the memory means of the identified module.

23. In a digital system including a plurality of modules interconnected by a bus arrangement, a method comprising the steps of:
  a) initiating a data transaction using a first module by initiating an address portion on the bus arrangement associated with the data transaction, said address portion identifying a second module and defining a data portion;
  b) accepting the address portion using said second module;
  c) using the second module, originating a translated address portion on the bus arrangement using said second module based on a set of criteria, said translated address portion identifying a specific module, other than said first module;
  d) accepting the translated address portion using the specific module; and
  e) executing the data portion using said specific module and said first module.

24. The method of claim 23 including the step of tracking said set of criteria using said second module.

25. The method of claim 23 wherein said bus arrangement includes at least one bus which interconnects all of said modules and which serves at least as an address bus and wherein said address portion of the transaction is initiated on said bus serving as the address bus and the translated address portion is transferred to the specific module on said bus serving as the address bus.

26. The method of claim 23 wherein said system includes at least four modules such that a selected one from a group including at least two of the modules may serve as the specific module and wherein said set of criteria, used by said translation arrangement in selecting the specific module, includes data relating to each of the modules which may serve as the specific module.

27. The method of claim 23 wherein said set of criteria includes information specifying utilization of the other modules each of which may serve as the specific module.

28. The method of claim 23 wherein the other modules, each of which may serve as the specific module, include processing means for use during the execution of the data portion of the data transaction.

29. The method of claim 23 wherein the other modules, each of which may serve as the specific module, each include memory means for storing data and said data portion of each data transaction is executed by storing data associated with said data portion in the memory means of the identified module.

30. In a digital system including a plurality of modules interconnected by a bus arrangement, a method comprising the steps of:
   a) initializing a data transaction using a first module by initiating an address portion on the bus arrangement associated with the data transaction, said address portion identifying a second module and defining a data portion;
   b) accepting the address portion with said second module;
   c) using the second module, selecting a particular module to participate in the execution of said data portion with said first module from a group of modules including said second module and one or more other modules based on a set of criteria;
   d) notifying said particular module in the form of a request to participate in said data portion with the first module; and
   e) executing the data portion using the particular module that is selected and the first module.

31. The method of claim 30 including the step of tracking said set of criteria using said second module.

32. The method of claim 30 wherein said bus arrangement includes at least one bus which interconnects all of said modules and which serves at least as an address bus and wherein said address portion of the transaction is initiated on said bus serving as the address bus and said particular module is requested to participate in the execution of said data portion on said bus serving as the address bus.

33. The method of claim 30 wherein said system includes at least four modules such that a selected one from a group including at least two of the modules may serve as the particular module and wherein said set of criteria includes data relating to each of the modules which may serve as the particular module.

34. The method of claim 30 wherein said criteria includes information specifying utilization of the second module and the other modules.

35. The method of claim 30 wherein the second module and the other modules include processing means for use during execution of the data portion of said data transaction.

36. The method of claim 30 wherein the second module and the other modules each include memory means for storing data and said data portion is executed by storing data associated with said data portion in the memory means of the particular module.

37. In a digital system including a plurality of modules interconnected by a bus arrangement and configured for performing a series of data transactions, a method comprising the steps of:
   a) generating a first transaction on the bus arrangement using a first module by initiating a first address portion associated with the first transaction, said first address portion identifying a second module and defining a first data transfer containing digital information;
   b) accepting the first address portion using said second module;
   c) selecting a particular module to participate in the execution of said first data transfer with said first module from the group of said second module and one or more other modules based on a set of criteria;
   d) notifying said particular module in the form of a request to participate in said first data transfer with the first module; and
   e) performing the first data transfer between the particular module that is selected and the first module such the digital information associated with the first data transfer is stored in the particular module.

38. The method of claim 37 including the step of tracking said set of criteria using said second module.

39. The method of claim 37 including the step of updating said set of criteria to indicate that said digital information is stored by said particular module.

40. The method of claim 37 wherein said bus arrangement includes at least one bus which interconnects all of said modules and which serves at least as an address bus and wherein said first address portion of the transaction is initiated on said bus serving as the address bus and said particular module is requested to participate in the execution of said first data transfer on said bus serving as the address bus.

41. The method of claim 37 wherein said system includes at least four modules such that a selected one from a group including at least two of the modules may serve as the particular module and wherein said set of criteria includes data relating to each of the modules which may serve as the particular module.

42. The method of claim 37 further comprising the steps of:
   e) performing a second transaction using said first module to initiate a second address portion on the bus arrangement associated with the second transaction, said second address portion identifying said second module as storing said digital information and defining a second data transfer for transferring the digital information to the first module;
   f) accepting the second address portion using the second module;
   g) translating the second address portion at said second module to produce a translated address portion which identifies said particular module;
   h) initiating the translated address portion on said bus arrangement;
   i) accepting the translated address portion using the particular module; and
   j) executing said second data transfer such that said digital information is transferred directly from the particular module to the first module over said bus arrangement.

43. In a digital system including an arrangement of modules interconnected by a bus arrangement in which a first module is configured for addressing a second module to initiate a transaction by initiating an address portion of the transaction on the bus arrangement which identifies the second module and which defines a data portion of the transaction, a method for system expansion comprising the steps of:
   replacing the second module with a combination of modules, said combination of modules including a selected module that is configured to function in a manner that appears to the first module to be identical to the replaced, second module when the first module addresses the selected module; and
   configuring at least one additional module, within the combination of modules, for cooperating with the selected module such that the additional module performs the data portion of the transaction so as to appear to the first module that the replaced, second module performed the data portion, whereby the first module experiences no apparent change in its environment.

44. In a digital system including an arrangement of modules interconnected by a bus arrangement in which a first module is configured for addressing a second module to initiate a transaction by initiating an address portion of the transaction on the bus arrangement which identifies the second module and which defines a data portion of the transaction, a system expansion arrangement for implementing a system expansion, said system expansion arrangement comprising:

a combination of modules configured for replacing the second module, said combination of modules including a selected module that is configured to function in a manner that appears to the first module to be identical to the replaced, second module when the first module addresses the selected module; and at least one additional module, within the combination of modules, which cooperates with the selected module such that the additional module performs the data portion of the transaction so as to appear to the first module that the replaced, second module performed the data portion, whereby the first module experiences no apparent change in its environment.

45. In a digital system including at least three modules for executing a data transaction using a bus arrangement which interconnects said modules, said data transaction including an address portion which defines a data portion, a configuration comprising:

a first one of said modules configured for initiating the address portion of said data transaction on said bus arrangement; and a second one of said modules configured for receiving the address portion of the transaction on the bus arrangement from the first module and including a translation arrangement configured for selecting, based on a set of criteria, a third module to participate in the execution of said data portion with said first module such that the second module translates the address portion of the transaction to the third module and the first and third modules then participate in said data portion of the transaction exclusive of the second module.

46. In a digital system including at least three modules for executing a data transaction using a bus arrangement which interconnects said modules, said data transaction including an address portion which defines a data portion, a method comprising the steps of:

configuring a first one of said modules for initiating the address portion of said data transaction on said bus arrangement; and arranging a second one of said modules to receive the address portion of the transaction on the bus arrangement from the first module; and using the second module, translating, based on a set of criteria, the address portion to a third module for participating in the execution of said data portion with said first module such that the first and third modules then participate in said data portion of the transaction exclusive of the second module.

* * * * *